(12) United States Patent
Whitens et al.

(10) Patent No.: US 7,347,471 B2
(45) Date of Patent: Mar. 25, 2008

(54) STORAGE CONSOLE FOR AUTOMOTIVE VEHICLE

(75) Inventors: Mike Whitens, Novi, MI (US); Kathleen Blackmore, Northville, MI (US); Peter Bejin, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 11/308,030

(22) Filed: Mar. 3, 2006

(65) Prior Publication Data

US 2007/0205622 A1 Sep. 6, 2007

(51) Int. Cl.
*B60R 7/04* (2006.01)

(52) U.S. Cl. .................... 296/24.34; 296/37.8

(58) Field of Classification Search ............ 296/24.34, 296/37.8, 37.14, 37.15
See application file for complete search history.

(56) References Cited

U.S. PATENT DOCUMENTS

| | | | |
|---|---|---|---|
| 4,818,008 A | 4/1989 | Cressoni | |
| 4,940,275 A * | 7/1990 | Miki et al. | 296/37.8 |
| 5,509,633 A | 4/1996 | Ruster et al. | |
| 5,702,041 A | 12/1997 | Sun et al. | |
| 6,343,835 B1 * | 2/2002 | Ledbetter | 297/188.2 |
| 6,616,206 B2 | 9/2003 | Luginbill et al. | |
| 6,719,343 B2 | 4/2004 | Emerling et al. | |
| 6,830,276 B2 | 12/2004 | Johansson, Sr. | |
| 6,890,012 B2 | 5/2005 | Maierholzner | |
| 2005/0146150 A1 | 7/2005 | Niwa et al. | |
| 2005/0248170 A1 | 11/2005 | Kawamoto et al. | |

FOREIGN PATENT DOCUMENTS

JP 5112181 5/1993

* cited by examiner

*Primary Examiner*—Dennis H. Pedder
(74) *Attorney, Agent, or Firm*—Greg Brown; Dickinson Wright PLLC

(57) ABSTRACT

A storage console for an automotive vehicle includes a manually moveable closure panel suspended upon the console's side walls at an installed location extending rearwardly from the front part of the console, so as to allow access to otherwise unusable space at the front of the console. A number of manually movable, interchangeable closure panels may be configured alternatively on opposite sides, so as allow a motorist to select from utilities such as cup holders, coin holders, powerpoints, and other utilities which are available in closure panel working surfaces.

16 Claims, 4 Drawing Sheets

STORAGE CONSOLE FOR AUTOMOTIVE VEHICLE

BACKGROUND OF THE INVENTION

The present invention is related to a storage console suitable for mounting between adjacent seating positions in an automotive vehicle.

Designers of automotive interiors have attempted to provide increased functionality with center mounted storage consoles. Of course, storage space is at a premium in most vehicles, given the motorist's desire to store such things as food and drink, audio cassettes, compact discs, and other items. Thus, flexible storage, including flexible center consoles, has evolved. U.S. Pat. No. 5,509,636 discloses a center console system in which a cup holder is part of a moveable block. The system of the '636 patent does not, however, provide any increase in storage capability, because the cup holder block is carried directly upon the floor of the console. U.S. Pat. No. 6,616,206 shows a moveable cup holder which does not address the issue of lost or wasted space at the front of a console. The system of the 206' patent merely allows for moving the cup holder, without accessing storage under the cup holder.

A storage console according to the present invention allows increased versatility of cup holders and other utilities, while at the same time providing increased storage and utilization of otherwise wasted space within a center console.

SUMMARY OF THE INVENTION

A storage console for an automotive vehicle includes a floor, and a rear wall attached to the floor. Opposing side walls are attached to the floor and to the rear wall. An upper front wall is attached only to the side walls, whereas a lower front wall is attached to the forwardmost part of the side walls and to the console's floor. A manually moveable closure panel is installed upon the side walls at a location extending between the upper front wall and the lower front wall encloses additional storage at the front of the console.

The console's side walls preferably have a full depth section extending from the rear wall to the upper front wall, and a partial depth section extending from the upper front wall to the lower front wall. The moveable closure panel may be hinged at a forward position, so as to allow it to tilt forward and up to expose the storage area under the closure panel. Alternatively, the closure panel may be hinged between the panel and one of the side walls, permitting the closure panel to be rotated so as to allow access to the storage area extending under the storage panel. As yet another alternative, the closure panel may be moveable translationally and vertically from the installed location in order to permit access to the underlying storage area.

When a translationally moveable closure panel is employed, alternative configurations of cup holders, coin holders, and even such utilities as a powerpoint, may be installed on alternative sides of the closure panel, thereby allowing a motorist to customize a vehicle's interior to his or her liking. The manufacturer of a vehicle having the present console may supply additional, optional, closure panels having other types of utilities incorporated therein. In essence, the closure panels may be constructed with interchangeable work surfaces including, for example, a first working surface having a plurality of integral cup holders, and a second work surface having at least one cup holder and a second utility, such as a coin holder or a powerpoint.

It is an advantage of the present inventive console that otherwise loss space at the front of the console may be put to good use as storage space.

It is a further advantage of a console according to present invention that the console may be easily customized by a motorist using components provided by the vehicle manufacture.

Other advantages, as well as features and objects of the present invention will become apparent to the reader of this specification.

DETAILED DESCRIPTION OF THE PREFERRED EMBODIMENTS

Figure 1:
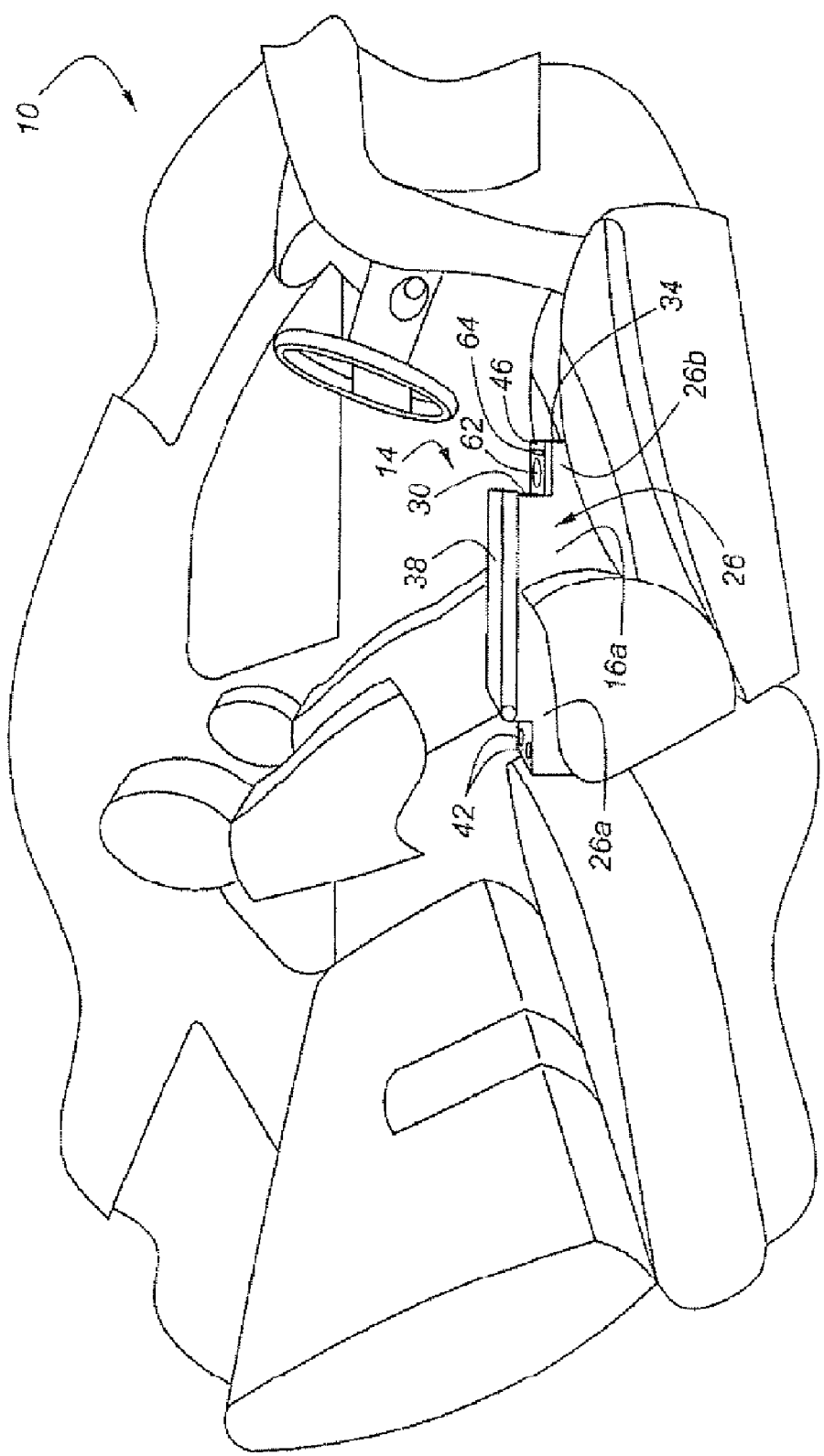
FIG. 1 is a perspective view of vehicular interior having a storage console according to the present invention.

As shown in FIG. 1, vehicle 10 is equipped with a center storage console, 14, having an armrest 38 an upper front wall 30, and a lower front wall 34. Console 14 also includes side walls 26 having full depth section 26a and partial depth section 26b. Although console 14 is shown with rear cup holders 42, those skilled in the art will appreciate in view of this disclosure that the present invention, which deals with front storage with console 14, may be combined with many other types of console configurations.

FIG. 1 also shows closure panel 46, which incorporates a large cup holder, 62, and a coin holder, 64. Closure panel 46, and for that matter, the balance of storage console 14, may be constructed from plastics or composites of metallic and non-metallic materials commonly employed for constructing automotive interiors.

Figure 2:
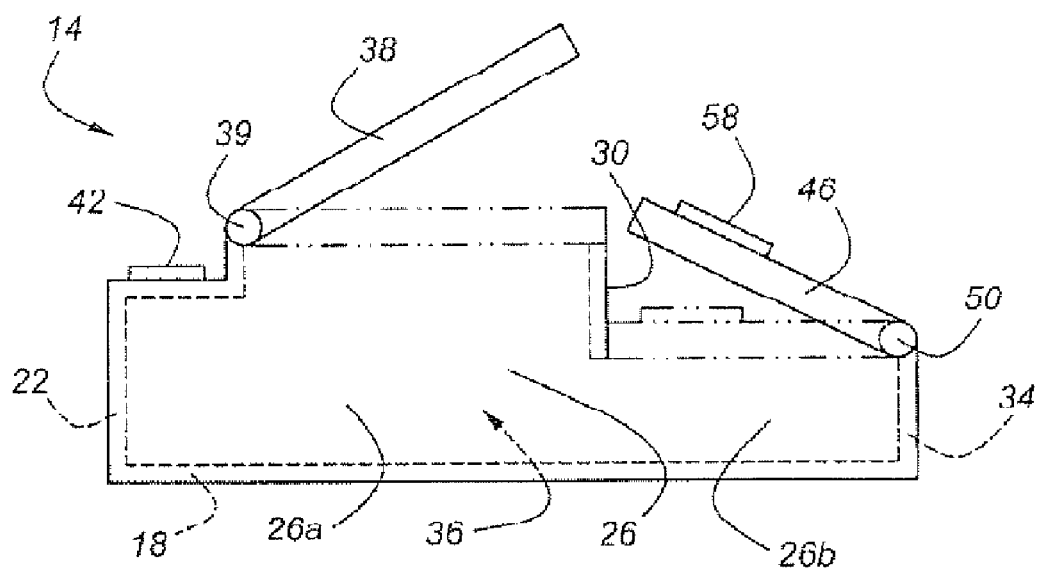
FIG. 2 illustrates the console of the present invention having a forward-hinged moveable closure panel.
Figure 3:
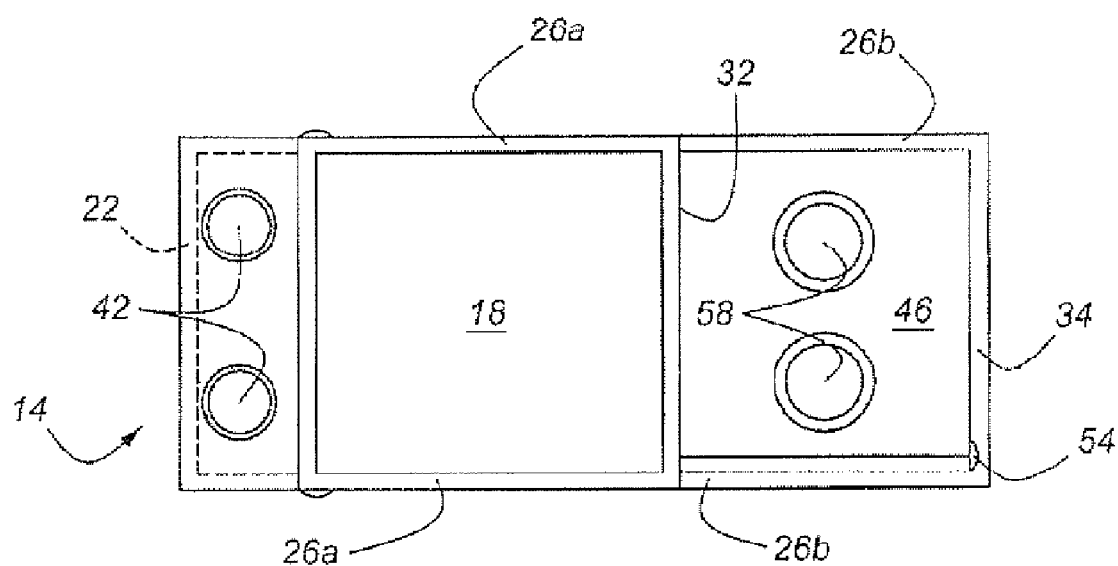
FIG. 3 illustrates consoles similar to FIG. 2 but having a side-hinged closure panel.

As shown in FIG. 2, armrest 38 has a hinged connection 39, about its trailing end, whereas closure panel 46 has a hinged connection, 50, between lower front wall 34 and closure panel 46. When closure panel 46 is rotated upwardly as shown in FIG. 2, and armrest 38 is similarly rotated upwardly, storage space 36 extending between lower front wall 34 and rear wall 22 of storage console 14 is completely accessible to the motorist. Thus, there is no "dead" space within console 14. In the embodiment of FIG. 2, closure panel 46 has two medium-sized cup holders 58. FIGS. 2 and 3 also show floor 18 of console 14.

In the embodiment of FIG. 3, closure panel 46 is shown as being hinged on the side by hinge 54, so as to allow a driver of the vehicle to rotate closure panel 46 manually to reach items stored underneath closure panel 46. Those skilled in the art will appreciate in view of this disclosure that in the absence of a hinge, closure panel 46 may be suspended upon steps formed in side walls 26b and retained by friction, or by gravity alone, or by means of a hookless fastening system, or by other means, all of which are beyond the scope of the present invention.

Figure 6:
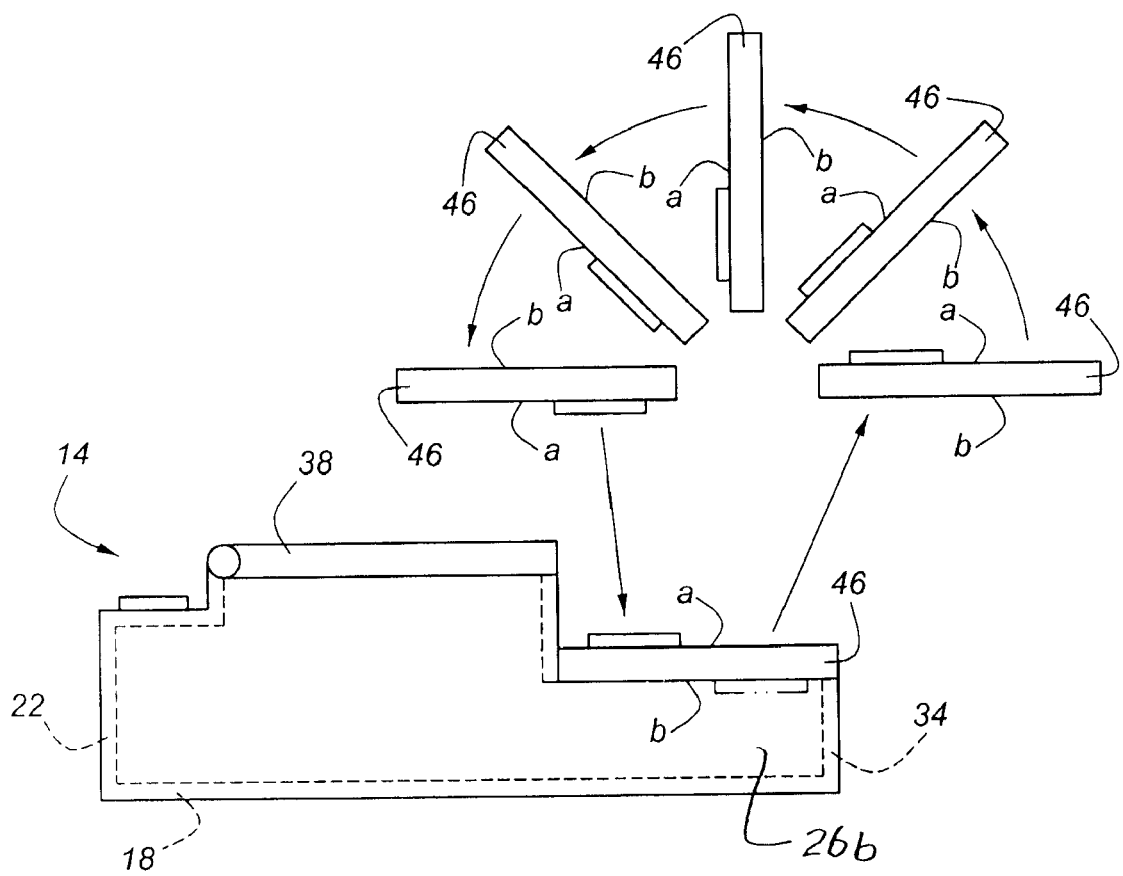
FIG. 6 illustrates the reversal of closure panel 46 according to an aspect of the present invention.

In yet another embodiment, closure panel 46 may be rendered in a form shown in FIG. 6, in which panel 46 is moveable translationally and vertically from the installed location as shown in FIGS. 1 and 3. In essence, closure panel 46 may be lifted vertically by the motorist, removed from its installed position and then rotated translationally so that a new surface, b, is revealed. While doing this, the motorist may access items within storage compartment 36.

Figure 4:
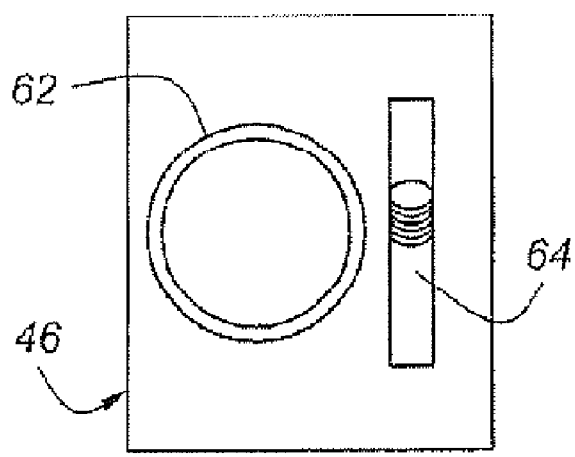
FIGS. 4 and 5 illustrate alternative embodiments for the present storage console closure panel.
Figure 5:
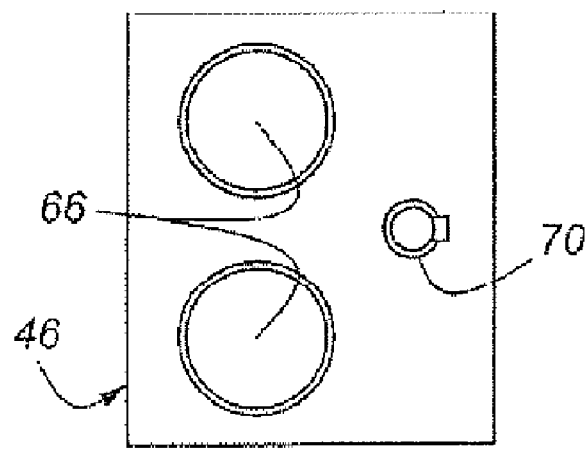

FIGS. 4 and 5 show alternative working surface embodiments of closure panel 46. In FIG. 4, closure panel 46 has large cup holder 62 and a coin holder 64 on one side, whereas the opposite side of panel 46, which is shown in FIG. 5, has two small cup holders, 66, and electrical powerpoint 70. Those skilled in the art will appreciate in view of this disclosure that many different types of working surface configurations, including various utilities, could be used with interchangeable closure panels 46 shown in FIGS. 4 and 5. Thus, different colors and designs for closure panel 46 may be provided by either original equipment or aftermarket manufacturers, so as to allow a motorist to change the appearance and utilities of a storage console according to his or her desire, merely by interchanging and providing a different closure panel.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A storage console for an automotive vehicle, comprising:
    a floor;
    a rear wall attached to said floor;
    opposing side walls attached to said floor and to said rear wall;
    an upper front wall attached only to said side walls;
    a lower front wall attached to the forwardmost part of said side walls and to said floor; and
    a manually movable closure panel installed upon said side walls at a location extending between said upper front wall and said lower front wall, wherein said movable closure panel comprises two alternative working surfaces, with said closure panel being movable translationally and vertically from its installed location in order to permit reinstallation with a selected one of said alternative working surfaces.

2. A storage console according to claim 1, wherein said side walls have a full depth section extending from said rear wall to said upper front wall, and a partial depth section extending from said upper front wall to said lower front wall.

3. A storage console according to claim 1, wherein said movable closure panel comprises a cup holder.

4. A storage console according to claim 1, wherein said movable closure panel comprises a coin holder.

5. A storage console according to claim 1, wherein said movable closure panel comprises a coin holder and a cup holder.

6. A storage console according to claim 1, wherein said movable closure panel has a hinged connection between said closure panel and said lower front wall, permitting said closure panel to be rotated so as to allow access to a storage area extending under said storage panel.

7. A storage console according to claim 1, wherein said movable closure panel has a hinged connection between said closure panel and one of said side walls, permitting said closure panel to be rotated so as to allow access to a storage area extending under said storage panel.

8. A storage console according to claim 1, wherein said movable closure panel may be moved translationally and vertically from said installed location in order to permit access to a storage area extending under said closure panel.

9. A storage console according to claim 1, further comprising an armrest hingedly mounted to said rear wall.

10. A storage console for an automotive vehicle, comprising:
    a floor;
    a rear wall attached to said floor;
    an upper front wall;
    a lower front wall attached to said floor;
    opposing side walls attached to said floor and to said rear wall, with each of said sidewalls having a full depth section extending from said rear wall to said upper front wall, and a partial depth section extending from said upper front wall to said lower front wall;
    an articulated armrest extending along the full depth section of said sidewalls, so as to enclose a primary storage area; and
    a manually movable closure panel installed upon said side walls at a location extending between said upper front wall and said lower front wall, with said closure panel enclosing a secondary storage area located at the forwardmost part of said storage console, wherein said movable closure panel comprises two alternative working surfaces, with said closure panel being movable translationally and vertically from its installed location in order to permit reinstallation with a selected one of said alternative working surfaces.

11. A storage console according to claim 10, wherein said primary storage area and said secondary storage area are unitary.

12. A storage console according to claim 10, wherein said closure panel comprises at least one cup holder.

13. A storage console for an automotive vehicle, comprising:
    a floor;
    a rear wall attached to said floor;
    an upper front wall;
    a lower front wall attached to said floor;
    opposing side walls attached to said floor and to said rear wall, with each of said sidewalls having a full depth section extending from said rear wall to said upper front wall, and a partial depth section extending from said upper front wall to said lower front wall;
    an articulated armrest extending along the full depth section of said sidewalls, so as to enclose a primary storage area; and
    a manually movable closure panel installed upon said side walls at a location extending between said upper front wall and said lower front wall, with said closure panel enclosing a secondary storage area, and with said closure panel having at least one cup holder mounted upon a working surface thereof, wherein said closure panel has two interchangeable working surfaces, including a first working surface having a plurality of integral cup holders, and a second working surface having at least one cup holder and a second utility.

14. A storage console according to claim 13, wherein said second utility comprises a coin holder.

15. A storage console according to claim 13, wherein said second utility comprises an electric power distribution point.

16. A storage console according to claim 13, further comprising a plurality of interchangeable closure panels, with each having a plurality of working surfaces.

* * * * *